United States Patent [19]
Wanger

[11] Patent Number: 5,615,345
[45] Date of Patent: Mar. 25, 1997

[54] SYSTEM FOR INTERFACING AN OPTICAL DISK AUTOCHANGER TO A PLURALITY OF DISK DRIVES

[75] Inventor: Mark E. Wanger, Fort Collins, Colo.

[73] Assignee: Hewlett-Packard Company, Palo Alto, Calif.

[21] Appl. No.: 489,016

[22] Filed: Jun. 8, 1995

[51] Int. Cl.⁶ .............................. G06F 13/00; G11B 17/22
[52] U.S. Cl. ............................................. 395/309; 369/30
[58] Field of Search .................................... 395/306, 309; 369/30, 33

[56] References Cited

U.S. PATENT DOCUMENTS

| 4,527,262 | 7/1985 | Manto | 369/33 |
| 4,766,581 | 8/1988 | Korn et al. | 369/30 |
| 5,148,432 | 9/1992 | Gordon et al. | 371/10.1 |
| 5,239,632 | 8/1993 | Larner | 395/306 |
| 5,274,783 | 12/1993 | House et al. | |
| 5,353,422 | 10/1994 | Kobayashi et al. | 395/425 |

FOREIGN PATENT DOCUMENTS

WO94/09426  4/1994  WIPO.

Primary Examiner—Jack B. Harvey
Assistant Examiner—Xuong M. Chung-Trans

[57] ABSTRACT

A system for interfacing an optical disk autochanger having a robot and a plurality of disk drives to a host includes a master SCSI bus, a subordinate SCSI bus, a SCSI multiplexer and a move controller. The master SCSI bus is connected to the host. The subordinate SCSI bus is connected to the plurality of disk drives. The multiplexer is connected between the master SCSI bus and the subordinate SCSI bus. The multiplexer transfers communications between the host and a selected disk drive. The move controller receives jukebox control commands from the host and selects the disk drive based on the jukebox control commands.

12 Claims, 10 Drawing Sheets

SYSTEM FOR INTERFACING AN OPTICAL DISK AUTOCHANGER TO A PLURALITY OF DISK DRIVES

BACKGROUND OF THE INVENTION

1. Field of the Invention

The present invention relates generally to systems and methods for increasing the number of devices connected to a SCSI bus and, more particularly, to a system and method for effectively increasing the number of disk devices of an optical disk autochanger which can be connected to a SCSI bus.

2. Related Art

The small computer systems interface (SCSI) is an ANSI standard communications bus that includes the electrical and logical protocol specification. SCSI provides for the connection of up to eight devices on the bus, each having a unique identification (ID) from zero to seven. The eight devices can be of any type, ranging from host computers to disk drives, tape drives, optical storage devices, printers, scanners, etc. ANSI document number X3.131-1986 (Global Engineering Documents, Irvine, Calif.) describes the electrical and logical protocol specifications for the SCSI. This document is incorporated by reference herein.

SCSI has become an industry standard. It is used, for example, in the computer workstation environment. It is also used in the personal computer environment. It has become the standard for peripherals, such as disk drives, tape drives, optical storage devices, printers, scanners, etc. Like all standards, SCSI is used in a large number of installed pieces of computer equipment. Users have invested considerable money in computers and peripherals which employ the SCSI.

With the constant increase in the performance/price ratio of computer systems, the amount of data and the number of peripherals that need to be accommodated by the SCSI has increased. The problem with this increase is that the SCSI can only accommodate eight devices. Them am many applications where more than eight devices are needed or desired.

FIG. 1 shows a block diagram of a conventional SCSI system. Referring now to FIG. 1, a host computer (also called an initiator) 102 has been arbitrarily assigned SCSI ID No. 7. The host computer 102 is electrically connected to an SCSI bus 104. Connected to SCSI bus 104 are seven additional devices (called targets) 106, 108, 110, 112, 114, 116, and 118. These additional (target) devices 106–118 can be any device that complies with the SCSI standard protocol. For example, devices 108 and 110 are optical disk drives in an optical disk autochanger or library 120. Devices 114 and 116 are optical disk drives in an optical disk autochanger 122. Devices 112 and 118 are robotic devices of autochangers 120 and 122, respectively. Additional device 106 represents any device which communicates via the SCSI protocol.

In this example of FIG. 1, additional device 106 has been assigned, for example, SCSI ID No. 0. Similarly, drive 108 has been assigned SCSI ID No. 1, drive 110 has been assigned SCSI ID No. 2, robotics 112 has been assigned SCSI ID No. 3, drive 114 has been assigned SCSI ID No. 4, drive 116 has been assigned SCSI ID No. 5, and robotics 118 has been assigned SCSI ID No. 6.

Another conventional concept is also illustrated in FIG. 1. The length of the SCSI bus is limited in order to achieve desired electrical performance. For example, the SCSI bus cannot be more than six meters long when a Single Ended approach is used. When Differential communications are used, the SCSI bus can have a maximum length of twenty-five meters.

There are many situations where the additional device is located more than six meters, or more than twenty-five meters, (depending on the communications scheme employed) from the host computer 102. This is graphically illustrated in FIG. 1. It is seen that a conventional repeater 124 connects additional device 106 via a SCSI bus 2 (assigned reference number 126) to the (main) SCSI bus 104. As is well known, repeater 124 provides the necessary signal amplification to allow for the additional device 106 to be physically situated more than the six meter or twenty-five meter limit from the host computer 102.

As is well known, the repeater 124 merely acts to boost the signal level of the signal received on one SCSI bus, which boosted signal is provided to a second SCSI bus and vice versa. In effect, it acts like a conventional repeater in terms of merely amplifying the signal levels from one bus to a second bus. It should be noted that no signal storage or mapping or other function occurs in repeater 124.

As stated above, there are many situations where it is needed or desired to have more than eight devices connected to a SCSI bus. One known approach for allowing for more than eight units to be effectively connected to the SCSI bus is shown in FIG. 2. The SCSI bus 104 is connected to a peripheral device 202. Peripheral device 202 is assigned a single SCSI ID number. As far as the SCSI bus 104 is concerned, peripheral device 202 has a single SCSI identification.

Peripheral device 202 includes a plurality of N drives, for example, (where N is a positive integer greater than 1). Specifically, in the examples shown, peripheral device 202 includes a drive 1 (labeled with reference number 218), a drive 2 (labeled with a reference number 224), and a drive N (labeled by reference number 230). A controller 204 electrically connects the SCSI bus 104 with the drives 218, 224 and 230 using a hard-wired, (often proprietary), and dedicated approach as follows.

As shown, controller 204 includes a microprocessor 206, switching electronics 208, a stored computer program 210, and electronic storage 212 for use by the controller 204 and microprocessor 206. Together, controller 204 routes information received from the SCSI bus 104 to the specific drive 218, 224, 230 as determined by the program stored in controller 204 in program 210. This routing is accomplished using individual buses and control lines for each of the drives. For example, as shown, drive 218 is connected to the controller 204 via a bus 214. In addition, a control line 216 is included, which allows controller 204 to control the operation of drive 218. Similarly, drive 224 includes a bus 220 and a control line 222, and drive 230 includes a bus 226 and a control line 228. It can be seen that this approach requires specific buses and control lines for the controller 204 in order to effect the desired data transfer.

Controller 204 must be programmed using its stored computer program 210 so as to be able to carry out the intended functions that are needed to accommodate the SCSI bus 104. It can be appreciated that the drives 218, 224 and 230 cannot be directly connected to the SCSI bus 104. Similarly, it can be appreciated that the controller 204 is required in order to accommodate the interfacing between the SCSI bus 104 and the drives 218, 224 and 230. Typically, controller 204 is required to reformat data received from SCSI bus 104 for transmission to one or more of the drives 218, 224 and 230, and for reformatting data received from a drive 218, 224, and 230 for transmission on the SCSI bus 104. Therefore, it can also be appreciated that considerable data reformatting and SCSI bus protocol accommodation must be made by the peripheral device 202. Nevertheless, peripheral device 202 provides additional storage capacity than can be accomplished using a single drive attached directly to SCSI bus 104.

The SCSI standard further includes a logical unit number (LUN). A logical unit number is specified from 0 to 7. Some host computers 102 include drivers (hardware and/or software) which provide the logical unit number, whereas others have more simple drivers that do not provide the logical unit number. Modification of the host computer to include such a driver is relatively simple and inexpensive and is conventionally known.

The provision of a logical unit number by the host computer 102 on the SCSI bus 104 allows for a peripheral device 202 to specify up to eight devices contained in the peripheral device 202. In other words, the logical unit number allows the peripheral device 202 to select a desired internal device that is being specified by the SCSI bus 104. Thus, up to eight devices can be contained in a peripheral device 202 having a controller 204 which can recognize and operate using a logical unit number provided on the SCSI bus 104.

Conventional approaches required that the controller 204 recognize the logical unit number, then act to control the internal devices 218,224 through 230, and to re-map data sent to and received from the devices 218, 224 through 230 via the controller 204. This requires typically that the devices 218, 224 and 230 be dedicated. It also requires considerable additional electronics to accommodate the logical unit function specified on the SCSI bus 104. Nevertheless, it can be seen that this results in a single SCSI ID number being able to accommodate up to eight internal devices as specified by the logical unit number.

Conventional approaches exhibit significant deficiencies. Where the logical unit number is not used, it can be seen that the number of devices that can be accommodated on the SCSI bus 104 is a maximum of eight. Where the logical unit number is employed, it can be seen that the maximum number of logical unit numbers of devices that can be accommodated on the SCSI bus 104 is fifty-six (7 SCSI ID numbers×8 logical units, where the first SCSI ID number is assigned to the host computer 102). However, considerable electronics is required to accommodate the additional devices that are assigned to a specific SCSI ID number. In addition, these devices typically have to be dedicated, and do not use the SCSI bus interface between their controller 204 and the device 218, 224 through 230. Reformatting and control signaling is required, and existing devices merely having SCSI interfaces cannot be connected to the controller 204 or used in such a configuration.

Commonly owned U.S. Pat. No. 5,239,632 to Larner, titled "Device to Translate Logical Unit Number Communications on One SCSI Bus to ID Communications on a Subordinate SCSI Bus," incorporated herein by reference as if reproduced in full below, discloses a system and method which overcomes the above-noted limitations. A master SCSI ID number is assigned to a minnow device. Using the LUN, the minnow device is able to communicate with seven SCSI devices over a subordinate SCSI bus using a single SCSI ID number of the master SCSI bus.

The minnow device performs a select cycle to permit communication between an initiator device (a host) connected to the master SCSI bus and a target device (a disk drive) connected to the subordinate SCSI bus. The minnow device performs a re-select cycle to permit communication between the target device and the initiator device.

During a select cycle, an initiator device selects the minnow using SCSI ID number set on a master SCSI bus, and the minnow responds and retrieves a logical unit number from an Identify Message Out command, according to standard SCSI protocol. The minnow then converts the logic unit number to the ID of the specified target device on a subordinate SCSI bus, the target device responds and an Identify Message Out command is sent to the target device on the subordinate SCSI bus. The minnow then connects the master SCSI bus to the subordinate SCSI bus so that the initiator device can communicate with the target device.

During a re-select cycle, the target device re-selects the minnow using the SCSI ID number sent on the subordinate SCSI bus. The minnow converts the subordinate bus SCSI ID number to the logical unit number of the master SCSI bus, re-selects the initiator device on the master SCSI bus, and handshakes the Identify Message In to the initiator. The minnow then connects the master SCSI bus to the subordinate SCSI bus so that the target device can communicate with the initiator device.

While the system and method of the Larner patent allows up to fifty-six devices to be connected to a SCSI bus without requiring any modification of the devices in terms of the SCSI interfaces, further improvements in a SCSI-based environment are desired. For example, referring to FIG. 1, in the environment of an optical library 122 (also called an optical disk autochanger or jukebox), host 102 is required to track and control which disks are loaded into which drives. Host 102 controls disk swapping via robot 118 at SCSI ID no. 6. For example, assume disk A is loaded into drive 114 and disk B is loaded into drive 114. If host 102 wishes to access disk C, then it must send a command to robot 118 instructing the robot to perform a swap to replace one of disks A or B with disk C. After the swap, host 102 can communicate the disk access request to the drive containing disk C.

In such an environment, any change in the configuration of the drives within jukebox 122 must be made known to host 102. For example, if drive 114 becomes inoperable, this fact must be made known to host 102. Similarly, if drives axe added to jukebox 122 according to a scheme using logical unit numbers such as that disclosed in the Larner patent, then host 102 must know the logical unit number assignments for the additional drives. Whenever a change is made to the configuration of the drives in juke box 122, the change must be made known to the host. This requires that host 102 be reconfigured and m-booted, necessitating operator intervention and host down time.

What is needed is a system for increasing the number of disk drives in an optical disk jukebox which overcomes the limitations of known systems.

SUMMARY OF THE INVENTION

The invention is a system for interfacing an optical disk autochanger or jukebox to host. The system includes a master SCSI bus, a subordinate SCSI bus, a SCSI multiplexer and a move controller. The master SCSI bus is connected to the host. The subordinate SCSI bus is connected to a plurality of disk drives of the jukebox. The multiplexer is connected between the master SCSI bus and the subordinate SCSI bus. The multiplexer transfers communications between the host and a selected disk drive. The move controller receives jukebox control commands from the host and selects the disk drive based on the jukebox control commands.

When a robotic move or swap command is sent from the host, the move controller checks to see whether the requested disk is currently loaded into one of the disk drives of the jukebox. If the requested disk is currently loaded, then the move controller responds to the host with a move complete acknowledgement. It is not necessary for the move controller to swap any disks. Since the disk is already loaded, the SCSI multiplexer simply translates the master SCSI address to the subordinate SCSI address of the drive containing the requested disk. If the requested disk is not currently loaded, then the move controller determines which drive to load the disk into, sends the correct move commands to the robot of the jukebox and informs the SCSI multiplexer of the change. Then, when the host selects the drive, the SCSI multiplexer translates the master SCSI address to the subordinate SCSI address of the drive containing the requested disk.

The multiplexer includes a master selection machine, a subordinate selection machine, a master re-selection machine, a subordinate re-selection machine, a plurality of transceivers and a switch control machine. The master and subordinate selection machines are for connecting the host to the selected disk drive. The master and subordinate re-selection machines are for allowing the selected disk drive to re-select the host. The transceivers are for connecting the master SCSI bus to the subordinate SCSI bus once a disk drive has been selected.

A select cycle according to the invention operates as follows. The host computer selects "the disk drive" or the SCSI multiplexer using its master SCSI ID. The SCSI multiplexer responds and retrieves a logical unit number (LUN) from an Identify Message Out, according to standard SCSI protocol. The SCSI multiplexer now has the full SCSI ID (i.e., the SCSI address and LUN) of both the host and the SCSI multiplexer. The switch control machine within the SCSI multiplexer then maps its master SCSI ID to the correct subordinate SCSI ID on the subordinate SCSI bus. This mapping is in accordance with the information passed from the move control machine. The SCSI multiplexer then Selects the subordinate SCSI ID of the disk drive on the subordinate bus, the target disk drive responds and an identify message out is sent to the target disk drive on the subordinate SCSI bus. At this point, the switch control machine connects the master and subordinate SCSI busses through the transceivers to allow the host to communicate directly with the selected disk drive.

The move control machine keeps track of which disks are in the plurality of disk drives of the jukebox and controls disk swapping when required. If the move control machine receives a swap re, quest for a disk which is already in a drive of the jukebox, the move control machine simply responds to the host with a "swap complete" even though no swap actually occurs. It is not necessary for the move controller to swap any disks. Since the disk is already loaded, the SCSI multiplexer simply translates the master SCSI address to the subordinate SCSI address of the drive containing the requested disk. If the disk is not in a drive, the move control machine determines which drive to load the requested disk into, sends the correct move command to the robot of the jukebox, and informs the switch control machine of the change.

A re-select cycle according to the invention operates as follows. The target disk drive reselects the SCSI multiplexer using the SCSI ID sent on the subordinate SCSI bus. The SCSI multiplexer maps the subordinate SCSI ID to the master SCSI ID of the host on the master bus. The SCSI multiplexer reselects the host and handshakes the identify message in to the host. The switch control machine connects the master and subordinate SCSI busses through the transceivers to allow the host to communicate directly with the selected disk drive.

In one embodiment, the invention uses SCSI ID numbers on the subordinate SCSI bus to multiplex up to seven disk drives. In another embodiment, the invention uses LUNs as well. Using LUNs, the invention is able to multiplex up to 56 disk drives using a single subordinate SCSI bus. If additional drives are desired, additional subordinate SCSI buses may be added to the multiplexer.

The system of the invention will provide a jukebox which appears to a host computer to have only a single disk drive. However, the jukebox will appear to be capable of extremely quick swaps. For example, if the host computer makes a read request to disk A and then wants to read disk B, the host will send a swap command to the jukebox. Disk B, however, may already be loaded into another drive of the jukebox. In that case, the system of the invention will simply connect the drive containing the requested disk to the host computer. Making the electrical connection in this manner takes much less time than physically making a disk swap. Thus, to the host computer, the jukebox will appear to be capable of very fast disk swapping.

For ease of explanation, the invention has been described in an embodiment which addresses a single disk drive at a time. However, it is often desirable for the host to address two or more drives at a time to facilitate copy operations or co-dependent data access (e.g., one drive reading search information while other drives read data or image fries related to the search). Accordingly, in one embodiment, the host computer may address two or more drives at a time. In this case, the benefits of the invention are maintained. These include: fast virtual swaps, a transparent way to deal with a malfunctioning drive without involving the host software, and a way to upgrade the jukebox with more drives for better performance without requiring the host software or operating system to be changed to accommodate the upgrade.

The foregoing and other features and advantages of the invention will be apparent from the following, more particular description of a preferred embodiment of the invention, as illustrated in the accompanying drawings.

BRIEF DESCRIPTION OF THE DRAWINGS

The present invention as defined by the claims is better understood with reference to the written description read in conjunction with the following drawings. In the drawings, like reference numbers are used to indicate like elements. Also in the drawings, the left most digit of each reference number corresponds to the figure in which the reference number is first used.

DETAILED DESCRIPTION OF THE PREFERRED EMBODIMENTS

The preferred embodiments of the invention are discussed in detail below. While specific part numbers and/or configurations are discussed, it should be understood that this is done for illustration purposes only. A person skilled in the relevant art will recognize that other components and configurations may be used without parting from the spirit and scope of the invention.

The invention is described in the preferred environment of an optical disk (e.g., CD ROM, MO optical, CD-R, and the like) autochanger or optical library, commonly called a jukebox. While this is the preferred environment, it should be understood that the invention is not limited to this environment. A person skilled in relevant art will recognize that the invention has a variety of other application. These include, for example, magnetic tape libraries and RAID (redundant array of inexpensive disks) devices. In addition, the invention is not limited to SCSI and may be implemented in other environments (e.g., ESDI, fiber channel, or FDDI).

Figure 3:
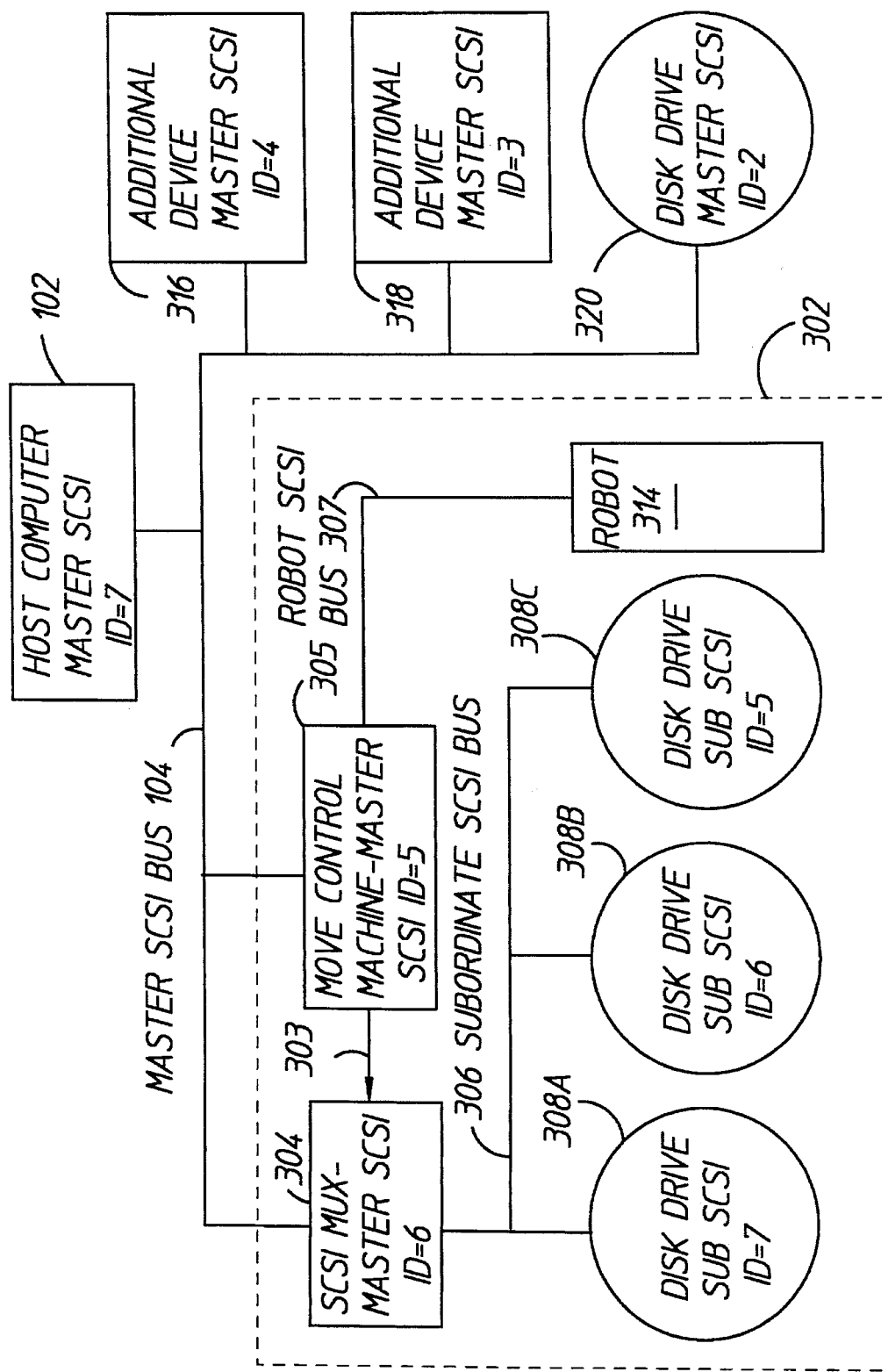
FIG. 3 is a block diagram at a high level of the architecture of the present invention.

Referring now to FIG. 3, a block diagram shows the high-level architecture of the present invention. Host computer (initiator) 102 provides SCSI ID numbers in accordance with the SCSI protocol. Host computer 102 is assigned SCSI ID number 7. Host computer 102 can be any computer system using a SCSI bus. For example, it can be a personal computer, a mainframe computer or a workstation. Example workstations include those made by Hewlett-Packard Company of Palo Alto, Calif.; Silicon Graphics, Inc. of Mountain View, Calif.; and Sun Microsystems of Mountain View, Calif.

Host computer 102 is connected to the SCSI bus 104. As shown in FIG. 3, it is labeled the "master" SCSI bus 104. The term master is used for ease of explanation and to distinguish SCSI bus 104 from a "subordinate" SCSI bus 306 described below. As far as host computer 102 is concerned, master SCSI bus 104 is the only SCSI bus. The term "subordinate" is also used merely for purposes of explanation. It should be noted that the protocol used on both of SCSI buses 104 and 306 is the standard SCSI protocol. Thus, it can be appreciated, that the devices connected to SCSI buses 104 and 306 can be ones that use the conventional SCSI protocol, and do not have to be modified or enhanced in any way to be used in the present invention.

Host computer 102 communicates with a jukebox 302, additional devices 316 and 318, and a magnetic or optical disk drive 320. As illustrated, additional device 316 has been assigned master SCSI ID number 4, additional device 318 has been assigned master SCSI ID number 3, and disk drive 320 has been assigned master SCSI ID number 2. Jukebox 302 has been assigned master SCSI ID numbers 5 and 6.

Jukebox 302 includes a SCSI multiplexer 304, a move control machine 305, a jukebox robot 314, a subordinate SCSI bus 306, a robot SCSI bus 307 and optical disk drives 308A, 308B and 308C. Of the two master SCSI ID numbers assigned to jukebox 302, master SCSI ID number 6 is assigned to SCSI multiplexer 304, and master SCSI ID number 5 is assigned to move control machine 305. From the perspective of host computer 102, the SCSI ID number of SCSI multiplexer 304 is the address of all drives within jukebox 302. Similarly, the SCSI ID number of move control machine 305 is the address of the jukebox robot 314.

Disk drives 308A, 308B and 308C are attached to SCSI multiplexer 304 via subordinate SCSI bus 306. It is the function of SCSI multiplexer 304 to control communications between one of disk drives 308 and host computer 102 over master SCSI bus 104. To accomplish this, SCSI multiplexer 304 connects a selected disk drive 308 to master SCSI bus 104. Which disk drive 308 is selected is controlled by SCSI multiplexer 304 and move control machine 305. However, multiplexer 304 will at all times appear to host computer 102 to be a single disk drive.

Figure 1:
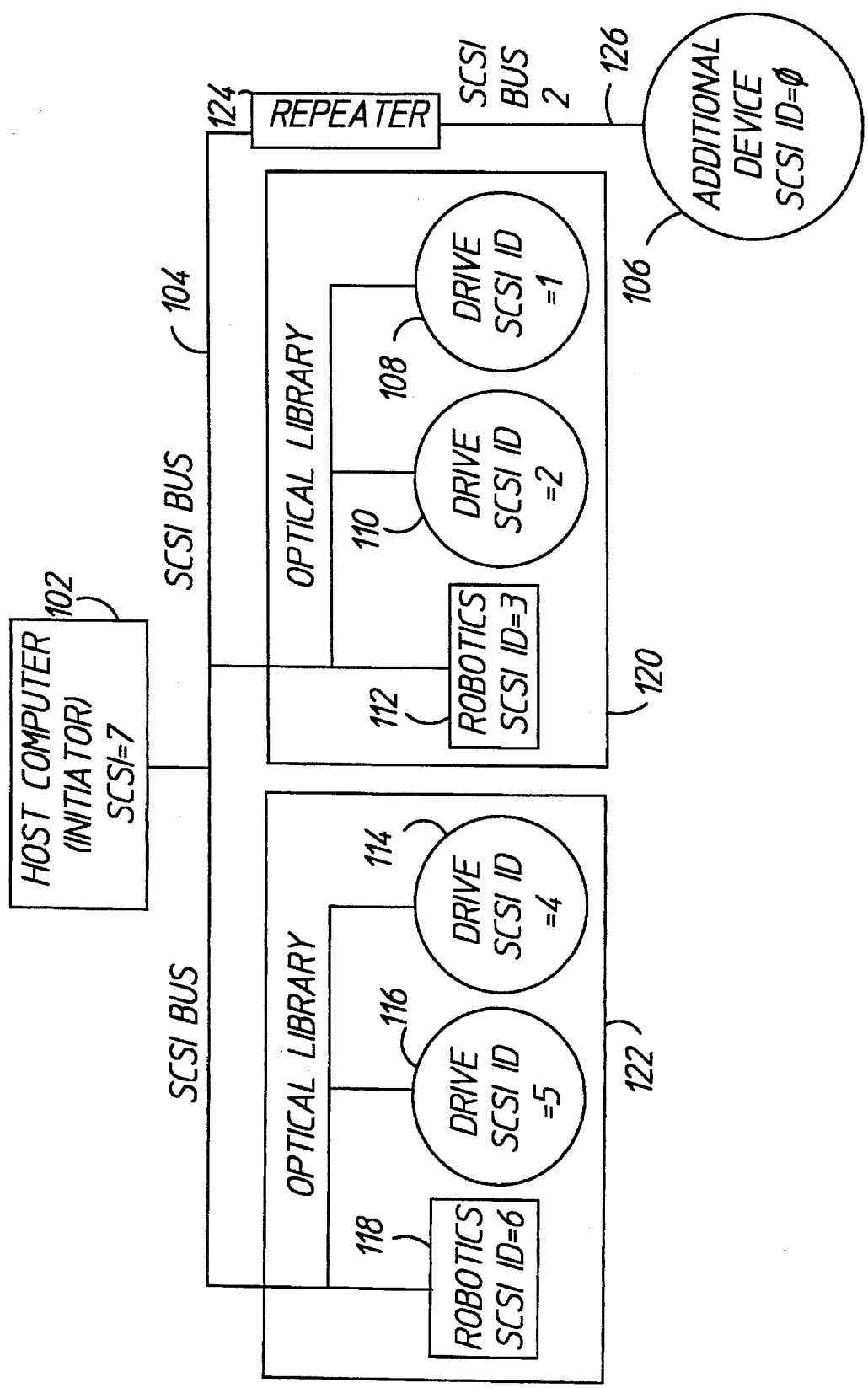
FIG. 1 is a block diagram of a conventional system having seven devices connected to a host computer on a SCSI bus, and including a repeater for allowing an increased distance between one device and the host computer.
Figure 2:
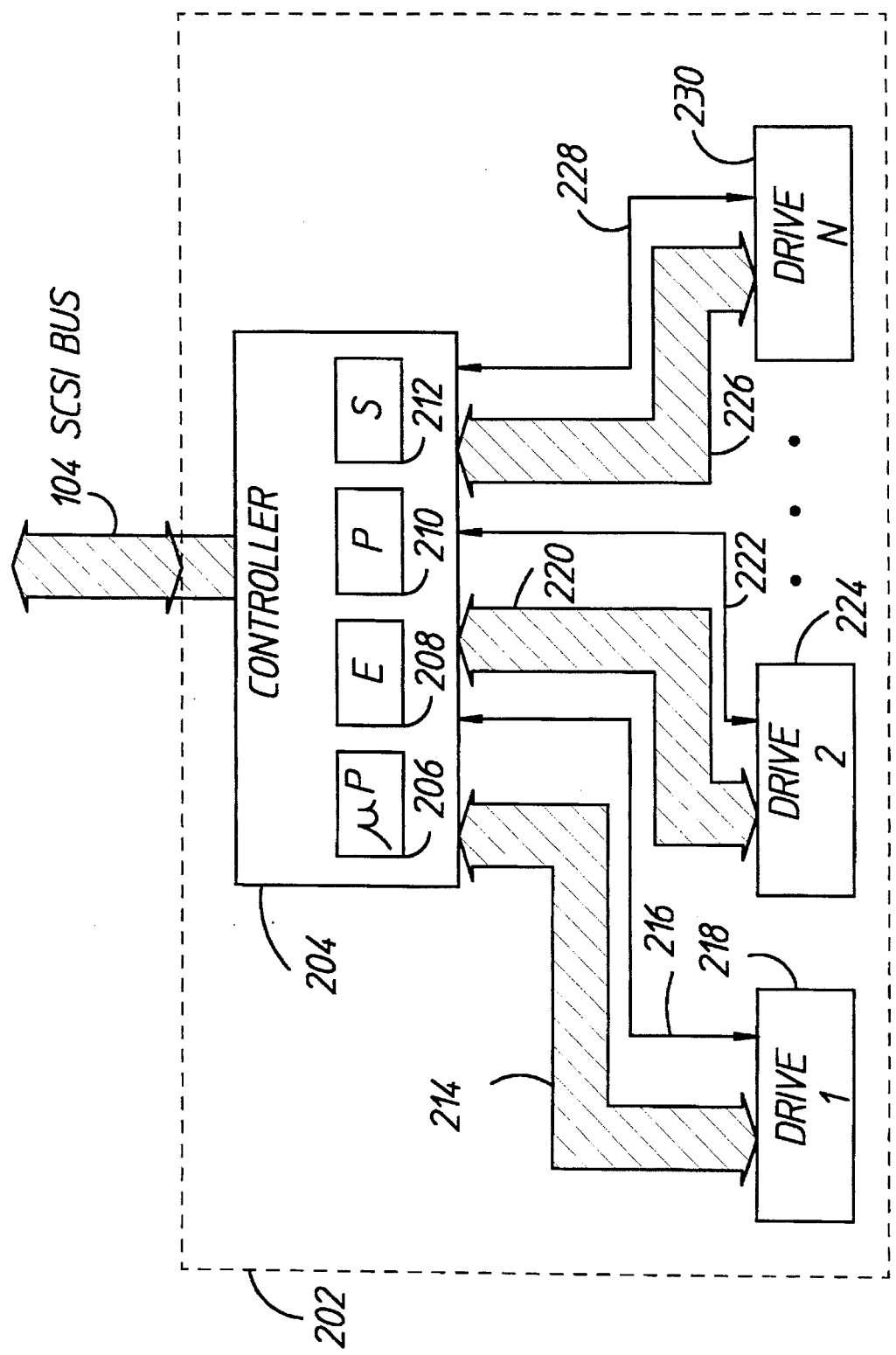
FIG. 2 shows a conventional peripheral device 202 architecture having several internal devices connected to the SCSI bus via a controller.

In a conventional jukebox configuration as illustrated in FIG. 1, host computer 102 keeps track of which disk is in which drive. Since each drive has a unique SCSI address on the SCSI bus, host computer 102 can directly address the drive containing the desired disk. If a desired disk is not in a drive, then a disk swap must be occur. Generally, the time required to perform a disk swap (i.e., to remove a disk from a drive and replace the disk with a new disk from a storage location), is several orders of magnitude larger than the time required to access data from a disk already resident in a drive. Thus, it is desirable to minimize disk swapping.

One way to minimize swapping is to increase the number of drives available to host computer 102. However, as discussed above, the SCSI is limited in the number of devices addressable on a single bus. LUNs may be used to increase that number. However, LUNs require that the host computer be configured to manage the LUNs. Moreover, an existing software application of host computer 102 may not have the capability to take advantage of either the LUNs or a large number of disk drives.

The present invention overcomes these limitations of prior systems and provides a system which can accommodate an unlimited number of disk drives using one or more SCSI ID numbers. For example, the system of the invention can accommodate ten disk drives using a single SCSI ID, 200 disk drives using a single SCSI ID, forty-six disk drives using four SCSI IDs, etcetera. In addition, the invention manages the disk drives in a manner that is transparent to host computer 104.

Using the invention, jukebox 302 appears to host computer 102 as a jukebox with a single disk drive but which is capable of very fast swapping. This is accomplished by move control machine 305 which works in conjunction with SCSI multiplexer 304 to connect an appropriate disk drive 308 to host computer 102. This is explained in greater detail using an example. Assume that drives 308A, 308B and 308C contain disks A, B and C, respectively. If host computer 102 last communicated with disk drive 308B, host computer 102 will believe that SCSI multiplexer 304 at master SCSI ID number 6 is disk drive 308B containing disk B. If host computer 102 next desires to access disk A, host computer 102 will instruct jukebox 302 to swap disk B for disk A. However, this command is not passed directly to robot 314.

Instead, move control machine 305 intercepts this command. Move control machine 305 then determines that disk A is already in disk drive 308A. Rather than swapping disk B out of drive 308B, move control machine 305 and SCSI multiplexer 304 simply connect disk drive 308A, as well as reporting "swap complete," to host computer 102. Host computer 102 believes that a swap has occurred. The "swap," however, has occurred in less than one tenth of a second rather than in six to ten seconds, which is an avenge time for a disk swap.

To accomplish this, move control machine 305 maintains a list of which disks are in which drives. Move control machine 305 also tracks which disk in one of drives 308 is least recently used. If an actual disk swap is required, the least recently used disk may be swapped out of its drive and replaced with a desired disk.

Move control machine 305 indicates a subordinate SCSI ID number to SCSI multiplexer 304 via control bus 303. When disk swapping is required, move control machine 305 provides the disk swap instructions to robot 314 over robot SCSI bus 307. In the example embodiment illustrated in FIG. 3, disk drives 308 are connected to SCSI multiplexer 304 via subordinate SCSI bus 306 while move control machine 305 communicates with robot 314 over robot SCSI bus 307. If desired, move control machine 305 may communicate with robot 314 over subordinate SCSI bus 306. The only limiting factor is the address limitation of the subordinate SCSI bus. The SCSI bus can accommodate seven disk drives using the SCSI ID numbers and 56 disk drives if LUNs are also used. In addition, jukebox 302 may be configured with additional SCSI buses connected to multiplexer 304 to connect additional disk drives.

Figure 4:
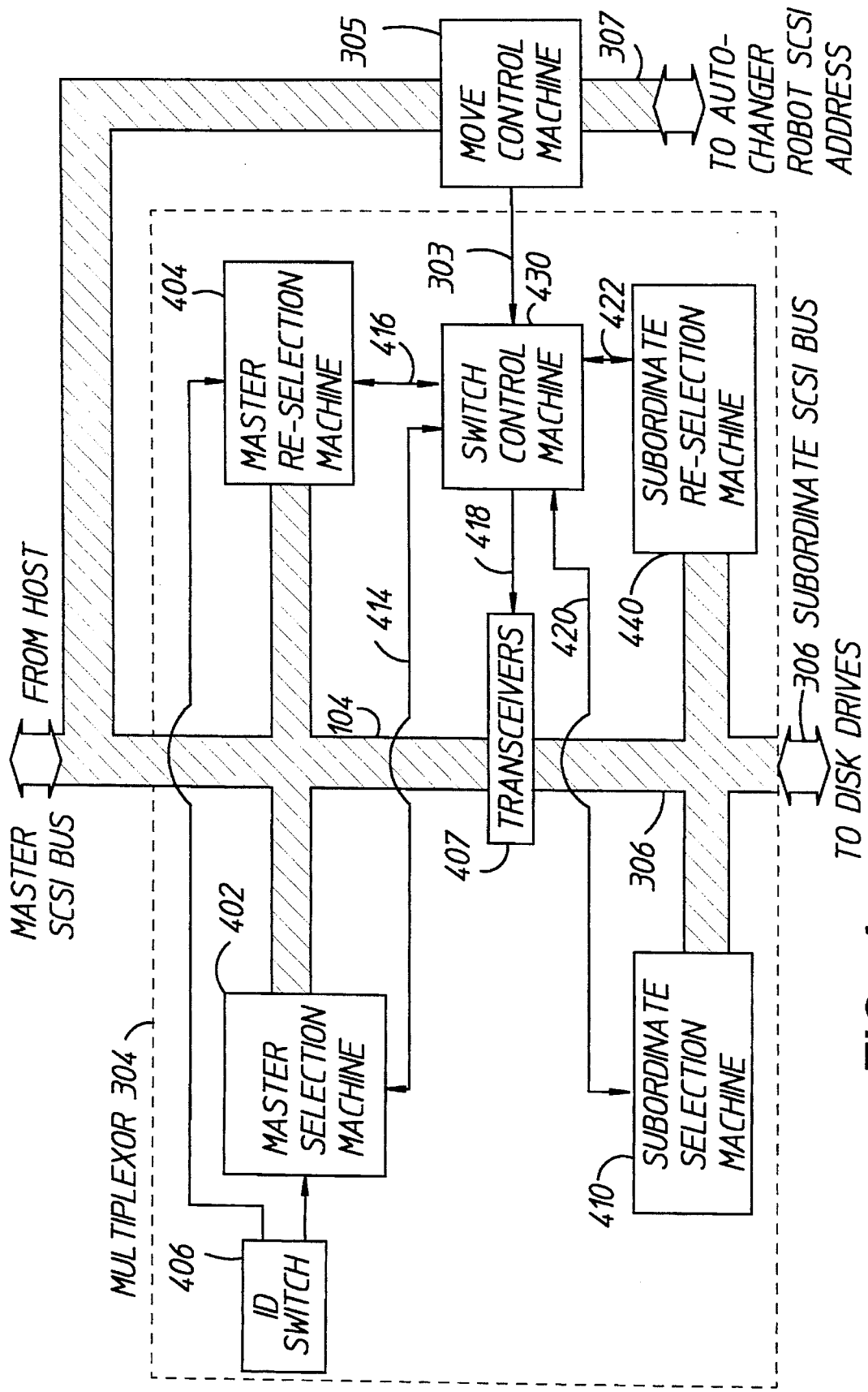
FIG. 4 is a block diagram of the architecture of a SCSI multiplexer 304 of the invents.

FIG. 4 illustrates in greater detail the structure and operation of SCSI multiplexer 304 and move control machine 305. As illustrated, SCSI multiplexer 304 includes an ID switch 406, a master selection machine 402, a master m-selection machine 404, transceivers 407, a switch control machine 430, a subordinate selection machine 410 and a subordinate re-selection machine 440. Master SCSI bus 104 is connected to master selection machine 402, master re-selection machine 404, and transceivers 407. ID switch 406 is connected to master selection machine 402 and to master re-selection machine 404. The ID switch 406, which typically is a DIP or toggle switch of conventional design, can be set by the user to specify the master SCSI ID number of SCSI multiplexer 304 on master SCSI bus 104.

Master selection machine 402 and master reselection machine 404 each communicate with the host computer on the master SCSI bus and pass control and target SCSI ID information to, and receive control and target SCSI ID information from, switch control machine 430. Subordinate selection machine 410 and subordinate reselection machine 440 each communicate with the target drive on subordinate SCSI bus 306 and pass control and SCSI ID information to switch control machine 430. Switch control machine 430 communicates master selection machine control signals 414 to/from the master selection machine 402, communicates master re-selection machine control signals 416 to/from the master re-selection machine 404, communicates transceiver control signals 418 to/from the transceivers 407, communicates subordinate selection machine control signals 420 to/from the subordinate selection machine 410, and communicates subordinate re-selection machine control signals 422 to/from the subordinate re-selection machine 440.

Switch control machine 430 controls the operation of the five devices (state machines 402, 404, 410, 440 and transceivers 407 via lines 418). Control is in accordance with the selection and m-selection cycles discussed below. Specific circuit implementations for the five state machines are not necessary for one of ordinary skill in the art to carry out the present invention, and should become evident to those working in the SCSI art. These state machines may be implemented, for example, in an ASIC, a microprocessor circuit or in a FPGA (field programmable gate array).

In the selection cycle, the master selection machine 402, subordinate selection machine 410, and switch control machine 430 are responsible for establishing communications from host computer 102 on master SCSI bus 104 with a drive 308 on subordinate SCSI bus 306 through transceivers 407. Master selection machine 402 establishes communication between host computer 102 and SCSI multiplexer 304. Host computer 102 selects SCSI multiplexer 304, and the master selection machine 402 responds and retrieves a LUN from an Identify Message Out, according to standard SCSI protocol. Master selection machine 402 then passes the SCSI ID of the host and control to switch control machine 430. Switch control machine 430 now has the full host SCSI ID (i.e., SCSI address and LUN) as well as the target SCSI ID on subordinate SCSI bus 306. Switch control machine 430 then maps the target ID to the correct SCSI ID on subordinate SCSI bus 306. This mapping is in accordance with the information passed from move control machine 305. Control is then passed to subordinate selection machine 410.

Subordinate selection machine 410 establishes communication between SCSI multiplexer 304 and the target drive on subordinate SCSI bus 306. The subordinate selection machine 410 selects the SCSI ID of the disk drive on subordinate SCSI bus 306, the target drive responds and an identify message out is sent to the target drive on subordinate SCSI bus 306. Control is then passed back to switch control machine 430. Switch control machine 430 then closes transceivers 407 to allow host computer 102 and the target drive 308 to communicate directly.

In the reselection cycle, master reselection machine 404, subordinate reselection machine 440, and switch control machine 430 are responsible for establishing communications from a selected drive 308 on subordinate SCSI bus 306 to host computer 102 on master SCSI bus 104 through transceivers 407. Subordinate reselection machine 440 establishes communication between SCSI multiplexer 304 and drive 308 on the subordinate SCSI bus. Subordinate selection machine 410 responds to a reselect from a disk drive 308 on subordinate bus 306 and retrieves the identify message in. Control and SCSI ID information are then passed to switch control machine 430. Switch control machine 430 then maps the subordinate SCSI ID to the correct master SCSI ID on master SCSI bus 104. This mapping is in accordance with the information passed from move control machine 305. Control is then passed to master reselection machine 404.

Master reselection machine 404 establishes communication between host computer 102 and SCSI multiplexer 304. Master reselection machine 404 reselects host 102 and handshakes the identify message in. Master reselection machine 404 then passes control to switch control machine 430. The switch control machine 430 then closes transceivers 407 to allow host computer 102 and target disk drive 308 to communicate directly.

Figure 5:
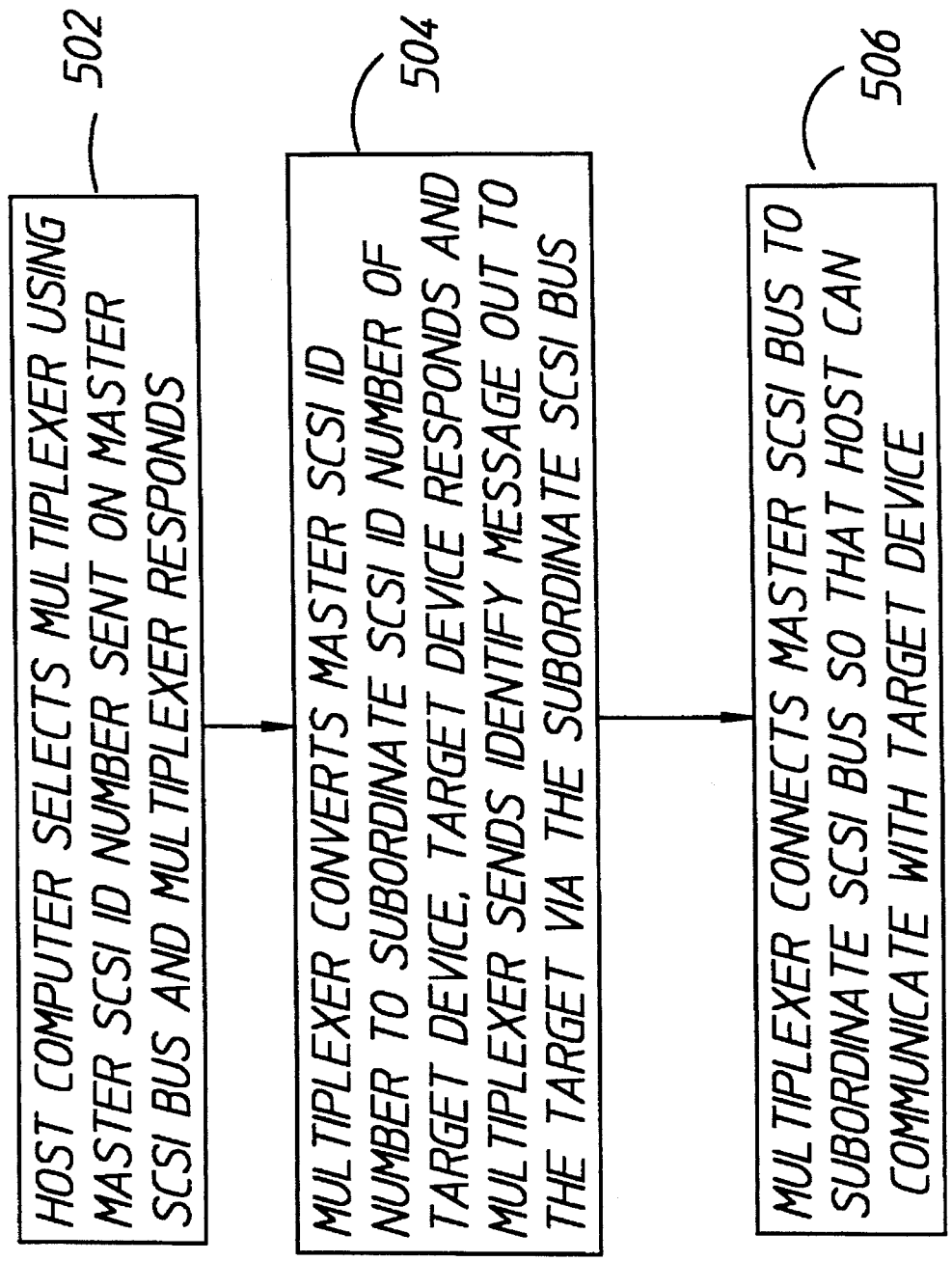
FIG. 5 is a high level flowchart of the steps of the select cycle of the present invention.
Figure 6:
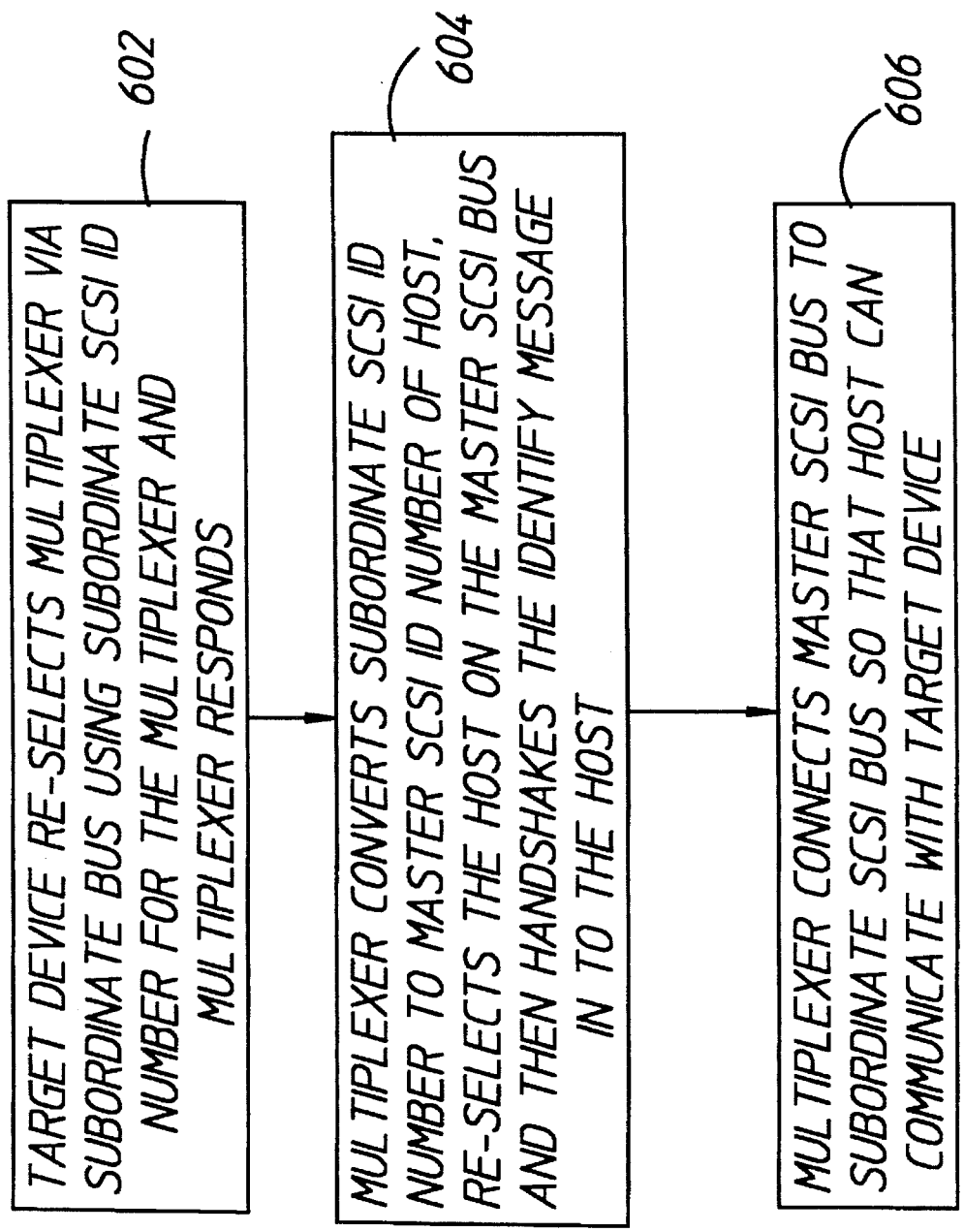
FIG. 6 is a high level flowchart of the steps of the re-select cycle of the present invention.

Operation of the present invention is described at a high level in connection with FIGS. 5 and 6. FIG. 5 shows at a high level the steps associated with a select cycle 500. FIG.

6 shows at a high level the steps associated with a re-select cycle 600. As used herein, the select cycle 500 and the re-select cycle 600 are in accordance with those cycles as used in the SCSI protocol. Them has been no modification in any way to the SCSI protocol with regard to the select cycle or the re-select cycle, or with respect to anything else in accordance with the present invention.

Referring now to FIG. 5, a select cycle 500 is illustrated. In a first step 502, the initiator (also called host computer 102) selects multiplexer 304 by sending its master SCSI ID number out on master SCSI bus 104. Multiplexer 304 responds to its master bus SCSI ID number. According to the known SCSI protocol this step 502 acts to establish communication in the Select cycle 500 between the host computer 102 and the multiplexer 304. As far as the host computer 102 is concerned, multiplexer 304, selected using the master SCSI ID number, is the target disk drive 308.

In a step 504, multiplexer 304 converts the master SCSI ID number to the subordinate SCSI ID number of the specified target disk drive on subordinate SCSI bus 306, the target disk drive responds, and multiplexer 304 sends to the drive the Identify Message Out command via the subordinate SCSI bus 306. In essence, step 504 constitutes the establishment of communications between the multiplexer 304 and the target disk drive.

In a final step 506, multiplexer 304 connects master SCSI bus 104 to subordinate SCSI bus 306 so that the host computer 102 can communicate with the target disk drive on subordinate SCSI bus 306. This communication from the host computer 102 to the target disk drive on subordinate SCSI bus 306 and vice versa appears to each side to be direct. This communication is established through transceivers 407.

As is well known, the SCSI protocol includes a re-select cycle 600. This allows a target disk drive to work on a task and not tie up the SCSI bus while it is working on this task. In other words, the target disk drive, once assigned a task in the select cycle, can get off the master and subordinate SCSI buses and start working on the specified task. When the target disk drive has gotten to the point in the specified task that it is ready to send data back out on the master and subordinate SCSI buses, it initiates the re-select cycle 600. In this way, optimal utilization of the SCSI master and subordinate buses occurs.

Referring now, to FIG. 6, in a first step 602 of re-select cycle 600, the target disk drive re-selects multiplexer 304 by sending its SCSI ID out on subordinate SCSI bus 306. Multiplexer 304 responds to its master bus SCSI ID number. This step 602 acts to establish communications in the re-select cycle between the target disk drive and multiplexer 304. As far as the target disk drive is concerned, multiplexer 304 is the host computer.

In a step 604, multiplexer 304 converts the subordinate SCSI ID number (of the multiplexer) to the master SCSI ID number of the host. The multiplexer then re-selects host computer 102 on master SCSI bus 104. Multiplexer 304 then handshakes the Identify Message In command to host computer 102 on master SCSI bus 104. In essence, step 604 constitutes the re-establishment of communications between multiplexer 304 and host computer 102.

In a final step 606 of the re-select cycle 600, multiplexer 304 connects master SCSI bus 104 to subordinate SCSI bus 306 so that the host computer 102 can communicate with the target disk drive on the subordinate SCSI bus 306. This communication from the host computer 102 to the target disk drive on subordinate SCSI bus 306 and vice versa appears to each side to be direct.

Figure 7:
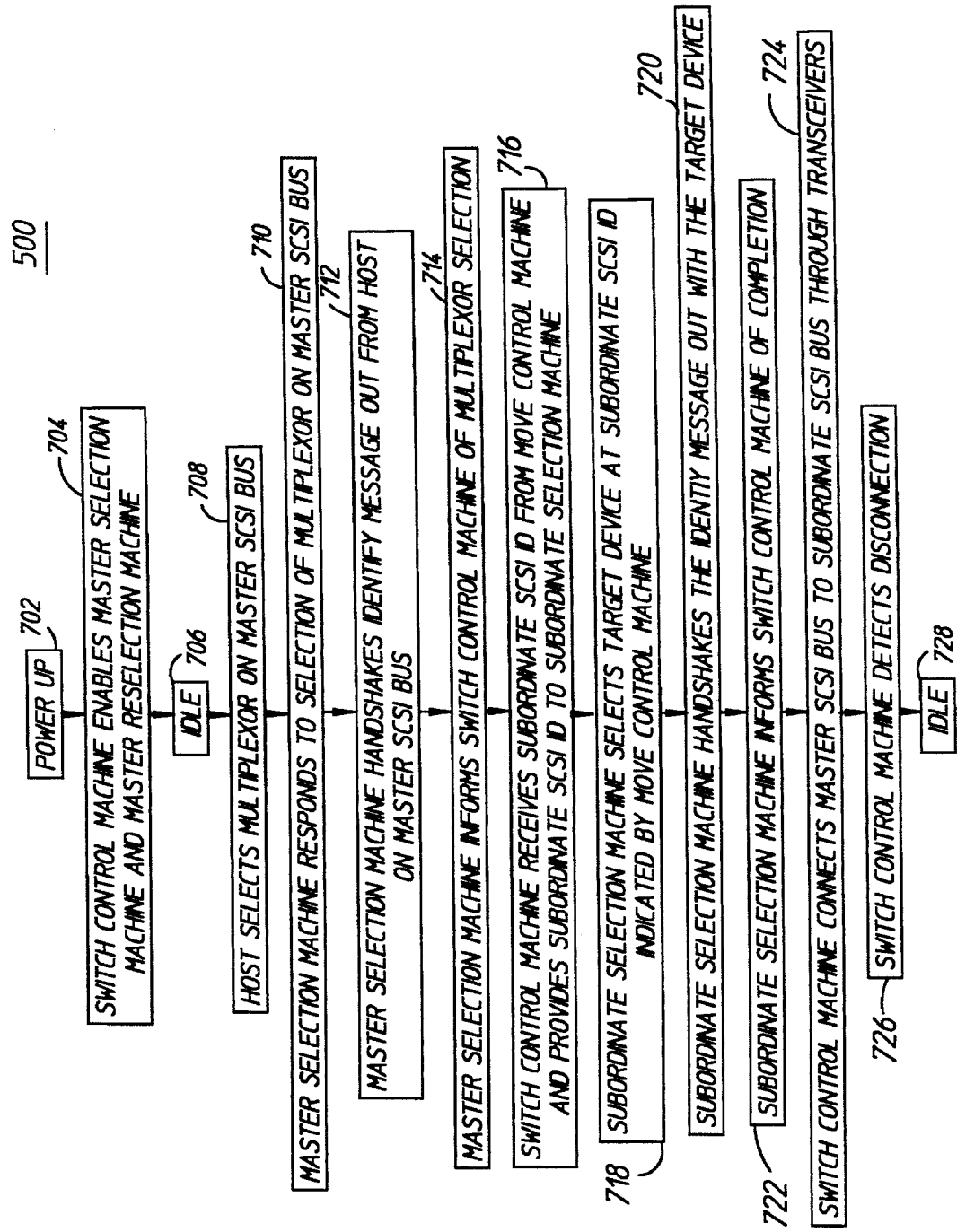
FIG. 7 is a more detailed flowchart of the steps of the select cycle of the present invention.

A more detailed version of the selection cycle 600 is now discussed with reference to FIG. 7. In a step 702, multiplexer 304 is provided with power in accordance with conventional approaches. Thereafter, in a step 704, switch control machine 430 enables master selection machine 402 and subordinate re-selection machine 410 Thereafter, in a step 706, the multiplexer 304 goes into an idle state.

Multiplexer 304 remains in the idle state, until step 708 when the host computer selects a target at the master bus SCSI ID (or address) as set by the ID switch 406. Thereafter, in a step 710, the master selection machine 402 responds to the selection of multiplexer 304 in accordance with the receipt of the master SCSI ID from the master SCSI bus 104 as set by ID switch 406. In a step 712, the master selection machine 402 handshakes an Identify Message Out command received from the host computer on the master SCSI bus 104.

In a step 714, the master selection machine 402 informs the switch control machine 430 via master selection machine control signals 414 of the selection. In a step 716, switch control machine 430 then sends the subordinate SCSI ID number for the appropriate disk drive 308 to subordinate selection machine 410 and enables subordinate selection machine 410 via lines 420. Thereafter, in a step 718, subordinate selection machine 410 selects the target disk drive on the subordinate SCSI bus 306 in accordance with the subordinate bus SCSI ID number received from switch control machine 430.

In a step 720, the subordinate selection machine 410 handshakes the Identify Message Out command with the target disk drive. The subordinate selection machine 410, in a step 722, informs switch control machine 430 of the completion of the handshaking after the Identify Message Out command with the target. Thereafter, in a step 724, switch control machine 412 via transceiver control signals 418 causes transceivers 407 to connect master SCSI bus 104 with subordinate SCSI bus 306 so that it appears as if direct communications is taking place between the host computer on master SCSI bus 104 and the target disk drive on subordinate SCSI bus 306. This communications takes place in accordance with the standard SCSI protocol as long as the host computer and target want it to take place. Once communications ceases, switch control machine 430 detects the disconnection, as indicated by a step 726. At that point, multiplexer 304 returns to the idle state 706.

Figure 8:
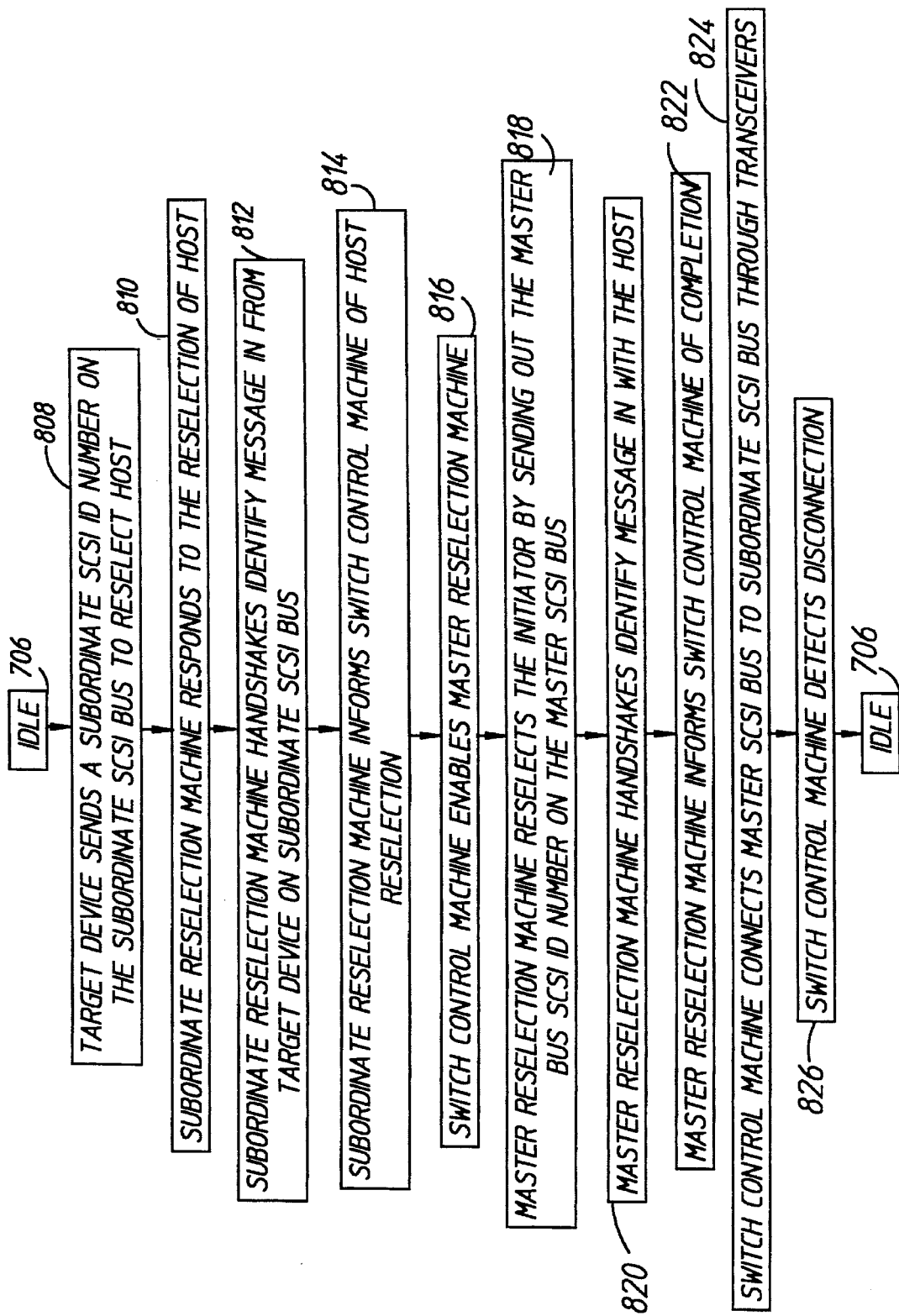
FIG. 8 is a more detailed block diagram of the steps of the re-select cycle of the present invention.

The re-selection cycle 600 is now described in greater detail with reference to FIG. 8. Multiplexer 304 is in the idle state 706 until the target re-selects the host computer by sending a subordinate bus SCSI ID number out on subordinate SCSI bus 306. This is indicated by a step 808. In a step 810, subordinate re-selection machine 440 responds to the re-selection of the host computer. In a step 812, subordinate re-selection machine 440 handshakes the Identify Message In command with the target.

In a step 814, subordinate re-selection machine 440 informs switch control machine 430 of the re-selection via subordinate re-selection machine control signals 422. Switch control machine 430 then enables master reselection machine 404, using master re-selection machine control signals 416, as indicated by a step 816. In a step 818, master re-selection machine 404 reselects the host computer by sending out the master bus SCSI ID number on the master SCSI bus 104 which corresponds to that of the host computer.

Thereafter, in a step 820, master re-selection machine 404 handshakes the Identify Message In command with to the host computer on master SCSI bus 104. Master re-selection machine 404 then informs the switch control machine 430 of the completion of this handshaking of the Identify Message In command, as indicated by a step 822. Switch control machine 430 uses transceiver control signals 418 to cause transceivers 407 to provide the proper connection between subordinate SCSI bus 306 and master SCSI bus 104 so that it appears that there is now direct communications between the target and the host computer. This is indicated by a step 824. This communication occurs until the communications have been completed. After the communications has been completed, switch control machine 430 detects the disconnection, as indicated by a step 826. Multiplexer 304 then enters the idle state 706.

The embodiment of the invention described above assumes that LUNs are not being used. In an alternate embodiment of the invention, LUNs may be used on both sides of multiplexer 304. That is, LUNs may be used on master SCSI bus 104 as well as on subordinate SCSI bus 306. For a detailed discussion of the use of LUNs, see the above-referenced U.S. Pat. No. 5,239,632 to Larner. Based on the present disclosure, implementation of the invention using LUNs will be apparent to a person skilled in the art.

Figure 9:
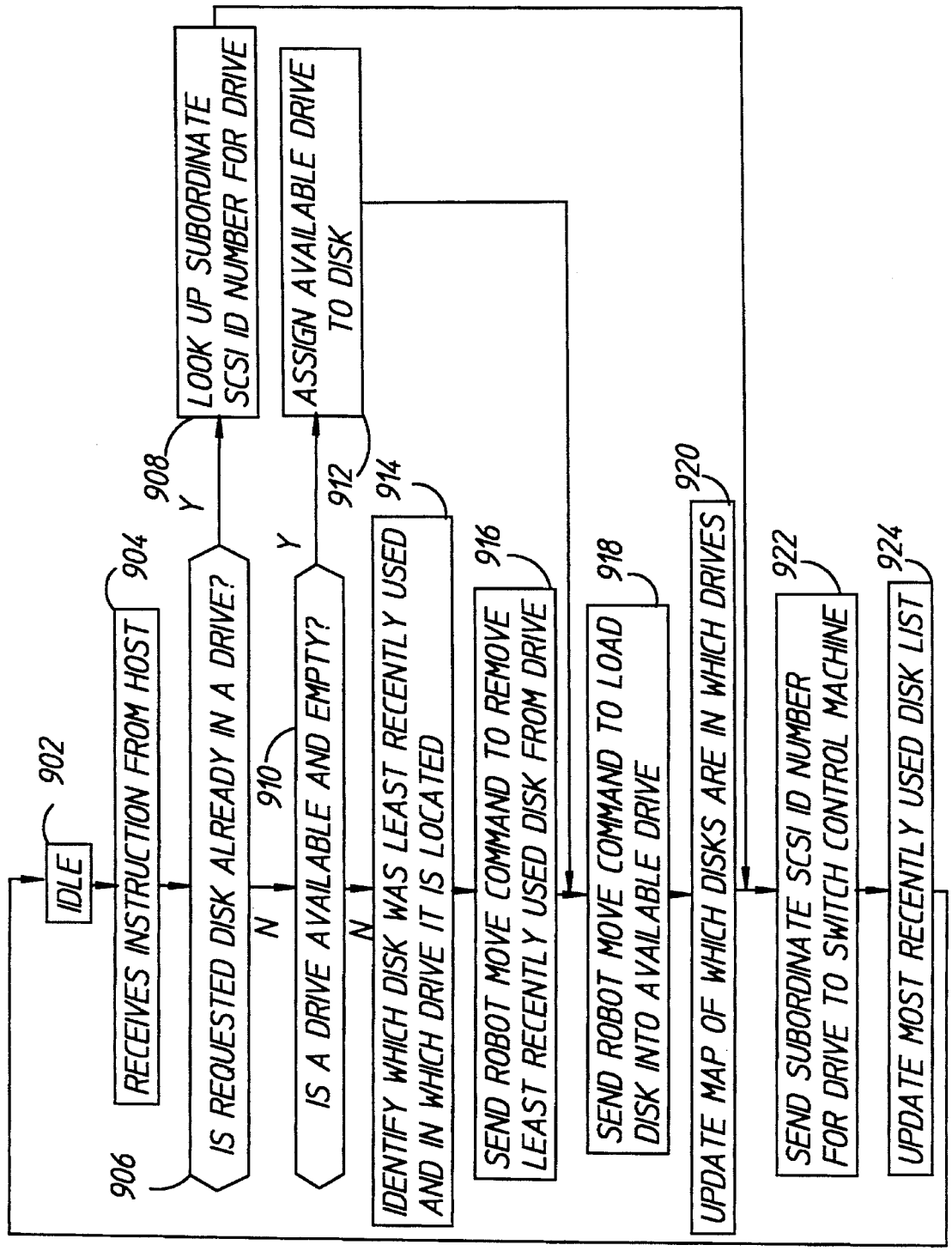
FIG. 9 is a flowchart illustrating operation of a move control machine 305 of the invention.

FIG. 9 illustrates operation of move control machine 305. In a step 902, move control machine 305 is in idle mode. In a step 904, move control machine 305 receives an instruction from host computer 102. The instruction is received on master SCSI bus 104. In a step 906, it is determined whether the instruction is a request for a disk which is already in one of disk drives 308. If the requested disk is not already in the drive then the method proceeds to step 910.

In step 910, it is determined whether a drive is available and empty. If a drive is not available and empty then the method proceeds to step 914. In a step 914, a least recently used disk table is checked to identify which disk loaded in a disk drive 308 has been least recently used. It should be noted that, while a least recently used algorithm is preferred, other criteria may be used in some applications to select a disk to be swapped out when an empty drive is needed.

In a step 916, move control machine 305 sends a move command to jukebox robot 314, instructing robot 314 to remove the least recently used disk from the drive. The disk move command is sent using the SCSI protocol on robot SCSI bus 307.

In a step 918, move control machine 305 sends a move command to robot 314 instructing robot 314 to load the requested disk into the now available disk drive. In step 920, a map or table of which disks are in which drives is updated to reflect the disk swap which has occurred in steps 916 and 918. In step 922, the subordinate SCSI ID number for the selected disk drive is provided to switch control machine 430 over control bus 303. Finally, in a step 924, the most recently used disk list is updated.

If, at step 906, it is determined that a requested disk is already in a drive, then the method proceeds to step 908. In step 908, the SCSI ID number for the drive containing the requested disk is determined. For example, the SCSI ID number may be looked up in a table. From step 908, the method then proceeds to step 922.

If, at step 910, it is determined that a disk drive is available and empty, then the method proceeds to step 912. In step 912, the available disk drive is assigned to the requested disk. The method then proceeds to step 918 where the robot is instructed to load the disk into the available drive.

As illustrated, move control machine 305 will intercept robot control instructions from host computer 102 on master SCSI bus 104. Move control machine 305 then translates these commands to provide subordinate SCSI ID numbers to switch control machine 430 and to provide robot commands to robot 314 over robot SCSI bus 307. By doing this, multiplexer 304 and move control machine 305 will appear to host computer 102 to be a single disk drive which, if not containing the desired disk, performs extremely fast swapping.

Figure 10:
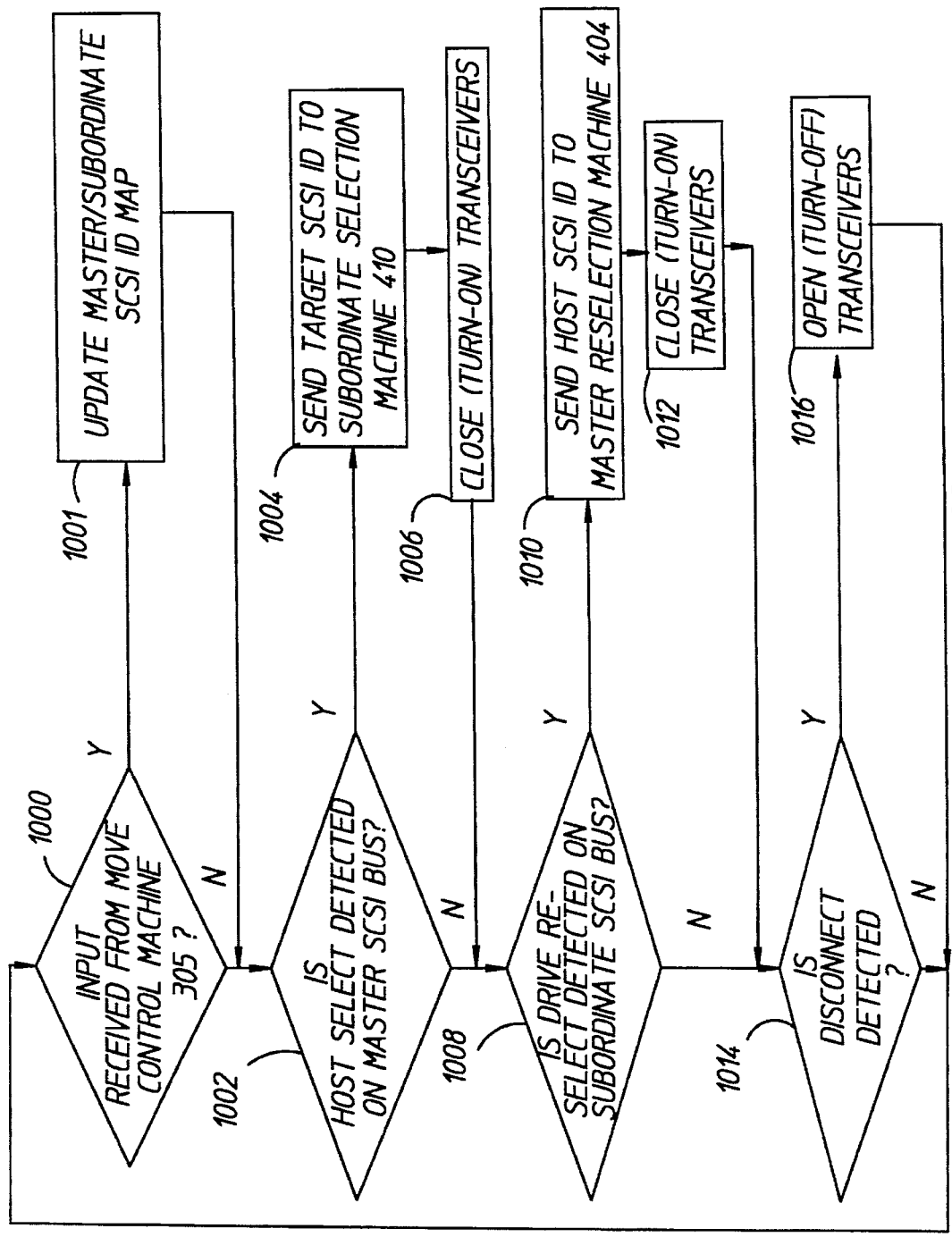
FIG. 10 is a flowchart illustrating operation of a switch control machine 430 of the invention.

FIG. 10 illustrates operation of switch control machine 430. In a step 1000, it is determined whether switch control machine 430 has received subordinate SCSI ID numbers from move control machine 305 over control bus 303. If input has been received from move control machine 305, then the master/subordinate SCSI ID map is updated at step 1001. Switch control machine 430 then determines, in a step 1002, whether a host select is detected on master SCSI bus 104. If a host select is detected, then switch control machine will send the subordinate SCSI ID to subordinate selection machine 410 (subordinate selection machine 410 will then select a drive 308 indicated by the subordinate SCSI ID number). This is illustrated in step 1004. Switch control macline 430 will then close or turn-on transceivers 407, in a step 1006, to connect master SCSI bus 104 to subordinate SCSI bus 306.

If, at step 1008, a drive re-select is detected on subordinate SCSI bus 306, then switch control machine 430 will send the host SCSI ID to master reselection machine 404 (master reselection machine 404 will then re-select the host using the master SCSI ID number) in a step 1010. Switch control machine 430 will then close or turn-on transceivers 407, in a step 1012, to connect master SCSI bus 104 to subordinate SCSI bus 306.

If a disconnect is detected, in a step 1014, then switch control machine 430 will open or turn-off transceivers 407 in a step 1016. If a disconnect is not detected, then the method returns to step 1000. Detection of select, reselect and disconnect signals is actually performed by selection machines 402 and 410 and re-selection machines 404 and 440. These state machines then provide the detected signals to switch control machine 430 for action.

The embodiment of the invention shown in FIG. 3 has been selected for purposes of illustration only. This embodiment shows three disk drives 308 connected to SCSI multiplexer 304. However, a greater or lesser number of disk drives may be used. An advantage of the invention is that modifications, such as adding or removing disk drives to multiplexer 304, may be made to jukebox 302 without requiring any modification to host computer 102 or any software program running thereon. This is particularly advantageous for maintaining backward compatibility with existing software programs while increasing system performance.

Modification to the number of disk drives connected to multiplexer 304 only requires that move control machine 305 be informed that additional drives are available and that robot 314 be configured to recognize any new drives. In addition, for ease of explanation, the invention has been described in an embodiment which addresses a single disk drive at a time. However, it is often desirable for the host to address two or more drives at a time to facilitate copy operations or co-dependent data access (e.g., one drive reading search information while other drives read data or image fries related to the search). Accordingly, in one embodiment, the host computer may address two or more drives at a time. In this case, the benefits of the invention are maintained. These include: fast virtual swaps, a transparent way to deal with a malfunctioning drive without involving the host software, and a way to upgrade the jukebox with more drives for better performance without requiring the host software or operating system to be changed to accommodate the upgrade.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

I claim:

1. A system for interfacing an optical disk autochanger having a robot and a plurality of disk drives to a host, comprising:

(a) a master SCSI bus connected to the host;

(b) a subordinate SCSI bus connected to the plurality of disk drives;

(c) multiplexer means, connected between said master SCSI bus and said subordinate SCSI bus, for transferring communications between the host and a selected one of the plurality of disk drives; and (d) control means, coupled to said master SCSI bus and said multiplexer means, for receiving jukebox control commands from the host and for selecting said selected one of the plurality of disk drives based on said jukebox control commands.

2. The system of claim 1, wherein said multiplexer means comprises:

selection means for connecting the host to said selected one of the plurality of disk drives; and re-selection means for allowing said selected one of the plurality of disk drives to re-select the host.

3. The system of claim 2, wherein said move control means generates a subordinate SCSI ID number for said selected one of the plurality of disk drives based on said jukebox control commands.

4. The system of claim 3, wherein said selection means comprises:

(a) transceiver means for connecting said master SCSI bus and to said subordinate SCSI bus;

(b) master selection machine means, connected to said master SCSI bus, for receiving a master bus Identify Message Out command from the host;

(c) subordinate selection machine means, connected to said subordinate SCSI bus, for receiving said subordinate SCSI ID number and for using said subordinate SCSI ID number to select one of the plurality of disk drives on said subordinate SCSI bus; and (d) switch control machine means, connected to said master selection machine means, said subordinate selection machine means, and said transceiver means, for causing said transceiver means to connect communications between the host and said selected one of the plurality of disk drives.

5. The system of claim 4, wherein said re-selection means comprises:

(a) subordinate re-selection machine means, connected to said subordinate SCSI bus, for receiving from said selected one of the plurality of disk drives, an Identify Message In command having a subordinate SCSI ID, and for convening said subordinate SCSI ID to a master SCSI ID;

(b) master re-selection machine means, connected to said master SCSI bus, for using said master SCSI ID from said subordinate re-selection machine means to re-select the host; and (c) switch control machine means, connected to said master reselection machine means, said subordinate re-selection machine means, and said transceiver means, for causing said transceiver means to connect communications between the host and said selected one of the plurality of disk drives.

6. The system of claim 1, wherein said multiplexer means comprises:

(a) transceiver means for connecting said master SCSI bus and to said subordinate SCSI bus;

(b) master selection machine means, connected to said master SCSI bus, for receiving a master SCSI ID and for acknowledging receipt of said master SCSI ID;

(c) subordinate selection machine means, connected to said subordinate SCSI bus, for receiving a subordinate SCSI ID from said move control means and for using said subordinate SCSI ID to select one of the plurality of disk drives on said subordinate SCSI bus; and (d) switch control machine means, connected to said master selection machine means, said subordinate selection machine means, and said transceiver means, for causing said transceiver means to connect communications between the host and said selected one of the plurality of disk drives.

7. A system for interfacing an autochanger having a robot and a plurality of media drives to a host, comprising:

(a) a master bus connected to the host;

(b) a subordinate bus connected to the plurality of media drives;

(c) multiplexer means, connected between said master bus and said subordinate bus, for transferring communications between the host and a selected one of the plurality of media drives; and (d) multiplexer control means, coupled to said master bus and said multiplexer means, for receiving autochanger control commands from the host and for selecting said selected one of the plurality of media drives based on said autochanger control commands.

8. The system of claim 7, wherein said multiplexer means comprises:

first means for receiving communications initiated by the host via said master bus;

second means for receiving communications initiated by one of the plurality of media drives via said subordinate bus; and switch means for connecting said master bus to said subordinate bus to transfer communications between the host and said selected one of the plurality of media drives.

9. The system of claim 8, wherein said multiplexer control means comprises:

autochanger control means for receiving autochanger control commands from the host, for tracking which media volumes are in which of the plurality of media drives, and for loading a requested media volume into one of the plurality of media drives in response to said autochanger control commands if said requested media volume is not already in one of said plurality of media drives; and switch control means for controlling said first means, said second means and said switch means to transfer communications between the host and said selected one of the plurality of media drives.

10. The system of claim 9, wherein said multiplexer control means generates a subordinate address for said selected one of the plurality of media drives based on said jukebox control commands.

11. The system of claim 10, wherein said first means comprises:
   (a) master selection machine means, connected to said master bus, for receiving a master bus command from the host; and
   (b) subordinate selection machine means, connected to said subordinate bus, for receiving said subordinate address and for using said subordinate address to select one of the plurality of media drives on said subordinate bus.

12. The system of claim 11, wherein said second means comprises:
   (a) subordinate re-selection machine means, connected to said subordinate bus, for receiving from said selected one of the plurality of media drives a subordinate address and for converting said subordinate address to a master address;
   (b) master re-selection machine means, connected to said master bus, for using said master address from said subordinate re-selection machine means to re-select the host.

* * * * *

UNITED STATES PATENT AND TRADEMARK OFFICE
CERTIFICATE OF CORRECTION

PATENT NO. : 5,615,345
DATED : 3/25/97
INVENTOR(S) : Mark E. Wanger

It is certified that error appears in the above-indentified patent and that said Letters Patent is hereby corrected as shown below:

Column 1, line 40, delete "Them am" and insert therefor
-- There are--.

Column 9, line 9, delete "avenge" and insert therefor
-- average--.

Column 15, Claim 3, line 35, delete "move".

Column 15, Claim 5, line 64, delete "convening" and insert therefor
--converting--.

Signed and Sealed this

Twelfth Day of October, 1999

Attest:

Q. TODD DICKINSON

Attesting Officer

Acting Commissioner of Patents and Trademarks